Nov. 5, 1935.  C. P. GRIFFITH  2,019,812
LIQUID DISPENSING DEVICE
Filed Sept. 30, 1931   7 Sheets-Sheet 2

Nov. 5, 1935. C. P. GRIFFITH 2,019,812
LIQUID DISPENSING DEVICE
Filed Sept. 30, 1931 7 Sheets-Sheet 6

Patented Nov. 5, 1935

2,019,812

UNITED STATES PATENT OFFICE 2,019,812

LIQUID DISPENSING DEVICE

Clement P. Griffith, Fort Wayne, Ind., assignor to S. F. Bowser & Company, Inc., Fort Wayne, Ind., a corporation of Indiana Application September 30, 1931, Serial No. 566,029

20 Claims. (Cl. 221—95)

My invention relates to apparatus for dispensing liquids. While the invention is capable of broad application to any liquid dispensing system, I have illustrated it as applied to a gasoline dispensing unit. It is understood, however, that this is by way of illustration only and not by way of limitation of the invention.

In general, my invention is particularly adapted in the dispensing of gasoline to a type of installation which includes the usual underground tank and a dispensing unit generally comprising an upstanding housing located above the underground tank and in which is mounted a pump, a meter, a sight glass and a wet hose with a manually operated valve controlled nozzle. In this type of device, the pump in the unit housing sucks gasoline from the underground tank upwardly through the meter which measures the flow, thence through the sight glass and thence through the valve controlled hose and nozzle. In these types of devices there has also been provided a means for removing the air entrained in the gasoline pump line prior to the time that the gasoline passes through the meter whereby to avoid false measurement, and such air relief means has generally included a check valve located below the measuring unit so that by reason of such construction and location, the proper operation of the air relief depended upon the correct functioning of these valves; in addition, these types of installation generally included a valve located somewhere in the suction pipe, or in the line for conveying the liquid from the storage tank to the meter and through the sight flow indicator to the hose, for the purpose of preventing the gasoline or other liquid leaking back from the sight glass and suction pipe to the storage tank whereby to prevent the meter measuring incorrectly when gasoline was dispensed for the first time. In addition, in prior devices, considerable trouble has been experienced with excess pressure caused by the expansion of the gasoline. Gasoline stored in underground tanks in the temperate zone will be of a temperature of approximately 40 to 50° F. Immediately after the dispensing operation, the device is full of liquid at this temperature. It frequently occurs that considerable time elapses before there is another dispensing operation and the temperature of the liquid in the device then approaches atmospheric temperature, which is frequently at 100° F., and sometimes more. Inasmuch as motor fuels expand 1% in volume for a change in temperature of approximately 16° F., it will be seen that excessive pressures are sometimes caused from this source which result in breakage of parts, leakage of the gasoline, and incorrect functioning of the device in general.

One of the objects of my invention is to eliminate all of the foregoing difficulties, disadvantages and inherent defects in construction and operation.

Another object of my invention is to provide a dispensing system of the general type hereinbefore illustrated wherein air or other gases are eliminated from the liquid flow-line prior to reaching the meter and in a manner such as to do away with the necessity for valves such as foot valves or check valves for the purpose of preventing incorrect measurement.

Another object of my invention is to provide a device of the general character indicated wherein a simple and effective means is provided for maintaining a solid column of liquid from the end of the hose to the inlet of the meter irrespective and without the use of check valves or foot valves, or irrespective of whatever may happen to the pump and more particularly to the suction line.

Another object of my invention is the provision of means for maintaining atmospheric pressure in the device at all times when the equipment is not in use and in the provision of means for returning to the underground storage tank any overflow of liquid caused by the expansion of the liquid due to heat.

Yet another object of my invention resides in the provision of a single unitary device associated with the flow line and comprising a liquid reservoir disposed at the highest point in the liquid flow line connecting the pump and the wet hose and which reservoir has associated therewith an air relief disposed above the uppermost level of the liquid in the reservoir and connected with the air vent returning to the under ground tank, by which construction all of the foregoing advantages are carried out.

These and other objects of my invention will be apparent from a perusal of the following specification when taken in connection with the accompanying drawings wherein.

Figure 1:
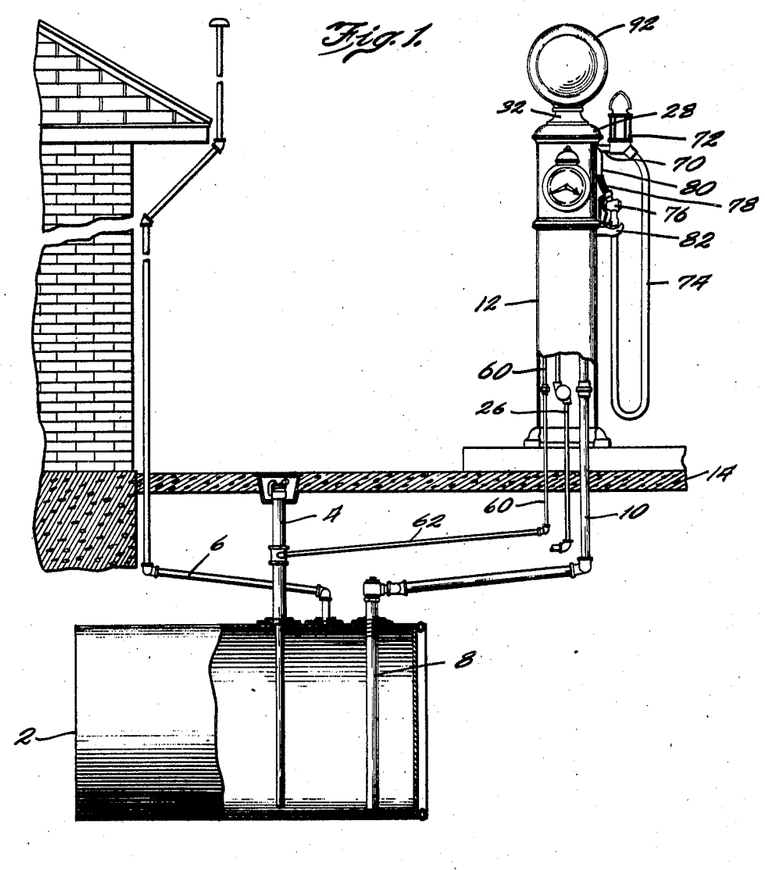
Fig. 1 is a rather diagrammatic view of my improved dispensing unit and the connections therefor to the tank.
Figure 2:
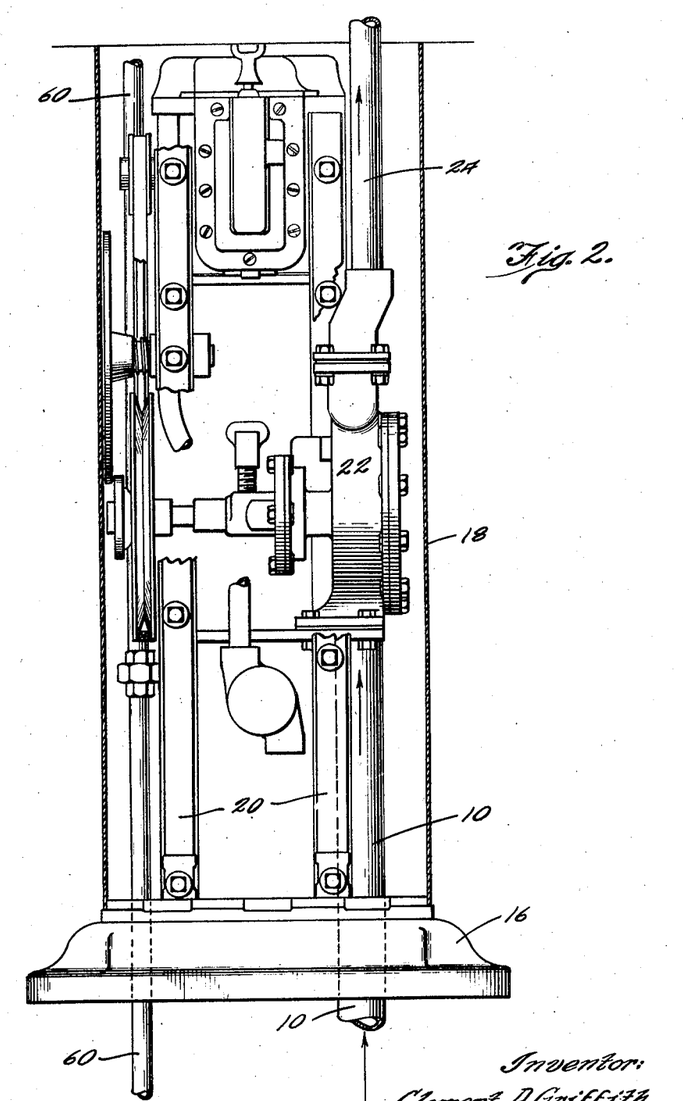
Fig. 2 is a side view partly in section of the bottom portion of the dispensing unit.
Figure 3:
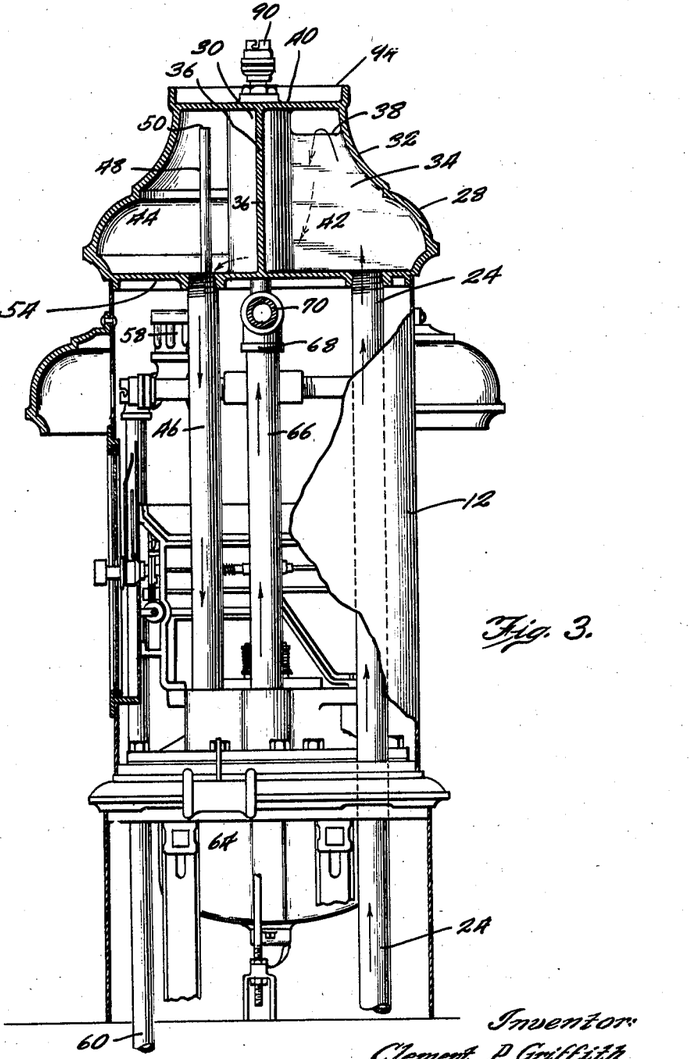
Fig. 3 is a partial view of the top portion of the unit.
Figure 5:
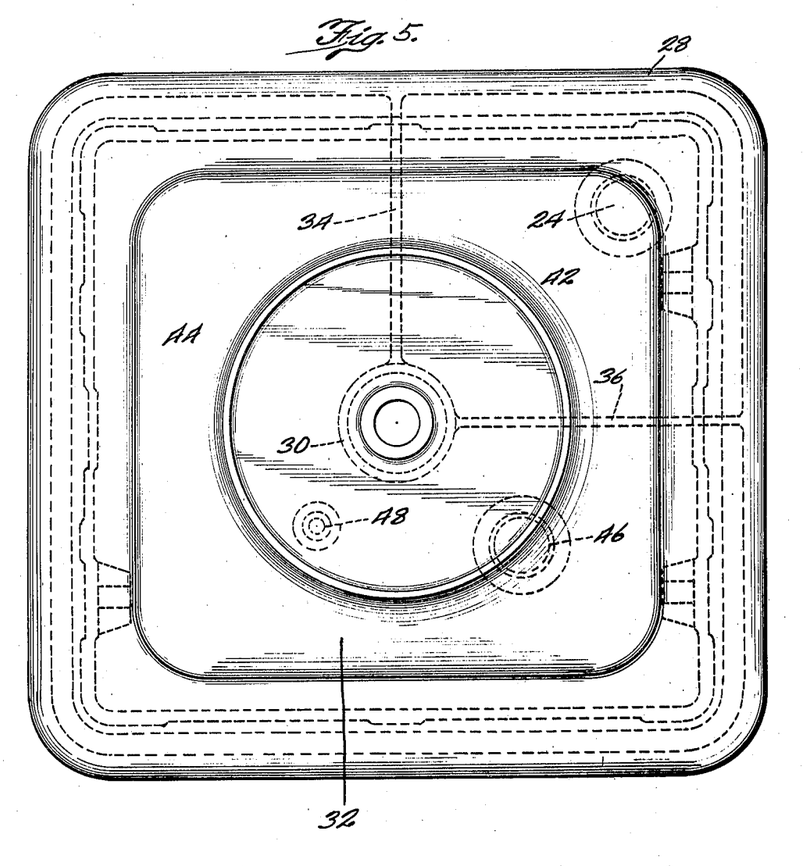
Fig. 5 is a view taken on line 5—5 of Fig. 3.

Referring now to the drawings in detail and particularly to Fig. 1, my invention comprises a usual underground tank 2 having an upstanding filling spout 4, the upper portion of which opens above ground so that the tank 2 may be filled. In addition the tank is provided with the usual air relief pipe 6, the upper end of which terminates in the atmosphere at a point well above the dispensing unit. In addition there is the usual liquid or gasoline suction pipe 8 which connects to a vertical pipe 10 which passes upwardly through the usual type of housing 12 mounted on the ground or concrete or base 14 and well above the underground reservoir 2. The dispensing unit or housing 12 may be of any design. In general it comprises a base 16 and upstanding sheet metal housing 18 provided with proper internal supporting frames 20 wherein is mounted the usual pump 22 connected at its inlet to the suction line 10 and to the discharge line 24. This pump is driven by the usual motor, the electrical connections for which pass downwardly through a conduit 26 through the bottom of the housing 12 to make an underground connection with a source of current as is well known in the art. By referring to Fig. 3, it will be seen that the pump discharge pipe 24 extends upwardly to the very top of the housing 12 and there terminates or empties into a relatively large reservoir or liquid-containing tank. In the form of my invention illustrated, this reservoir or tank comprises a casting 28 mounted on the top of the unit, and by referring to Figs. 3 and 5, it will be noted that this casting is formed with a central hollow sleeve 30 and surrounding upstanding side walls 32. While the shape of this casting 28 may be of any particular design I have shown it preferably square. Internally I provide two separate compartments which are formed therein by the two internal webs or walls 34 and 36 which are cast integral with the external walls 28 and the central hollow sleeve 30. Wall 36 extends from the bottom completely to the top of the tank whereas wall 34 extends upwardly to the point 38 which is spaced from the top 40 of the reservoir. The inlet pipe 24 from the pump empties into the compartment 42 formed by the side wall of the casting 28 and the two internal upstanding webs or partitions 32 and 36. It will be noted that the compartment 42 is considerably smaller than the size of the remaining compartment 44, which is formed by the remaining upstanding wall of the casting 28 and by the webs 36 and 32. The purpose of running wall 36 completely to the top while leaving wall 34 spaced from the top as shown in Fig. 3 at point 38, is to force the liquid entering through the inlet 24, (see Fig. 5) to pass over the top of wall 34 and thence pass entirely around the container 44 and out through outlet 46, thereby providing for the maximum time for the separation of the gas or entrained air.

Connected to the bottom of the compartment or the reservoir 44 is the liquid or gasoline outlet pipe 46, and located in this same compartment 44 is an air vent pipe 48, the upper open end 50 of which terminates above the upper edge of the partitions 34 and 36. This pipe 48 permits the escape of the air. It screws into a nipple 52 threaded into the bottom wall 54 of the reservoir portion 44. A pipe section 56 in turn is connected with the nipple and this pipe section carries a siphon breaker 58 hereinafter described, and a pipe 60 from the siphon breaker extends downwardly below the bottom of the housing and connects by means of a pipe 62 to the filling pipe 4 of the underground tank 2, whereby any air and/or liquid passing down through pipe 60 will be conveyed back to tank 2, the air escaping from the tank by means of the pipe 6.

Figure 7:
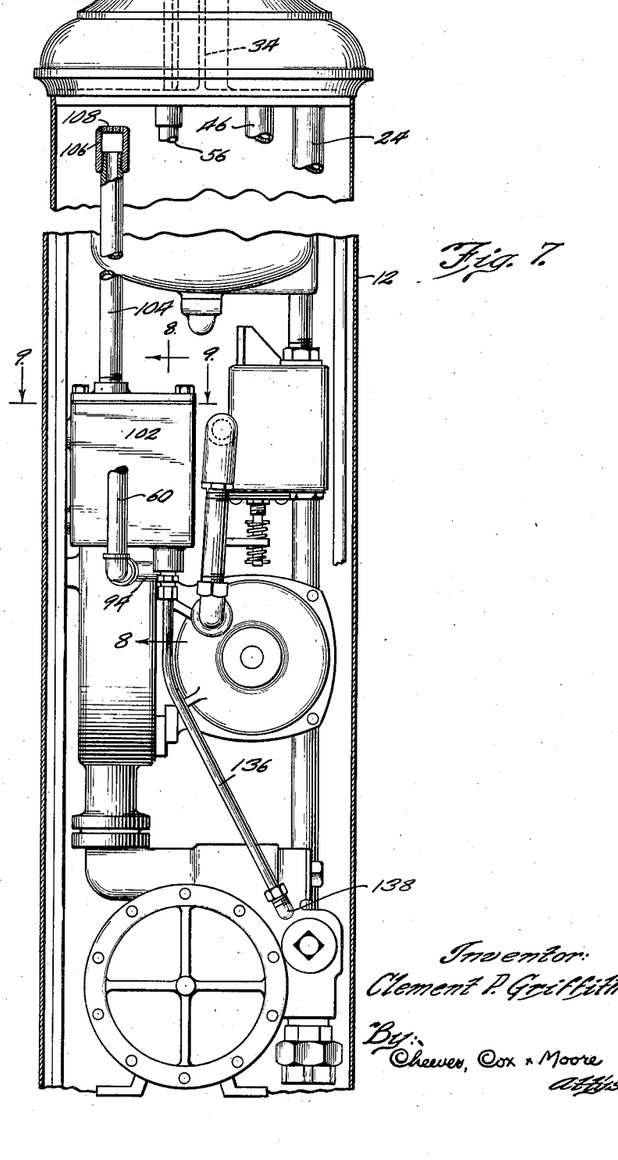
Fig. 7 is a side view partly in section of a modified type of construction in which the air release is fed to the atmosphere within the casing instead of being delivered to the underground tank.
Figures 8, 9:
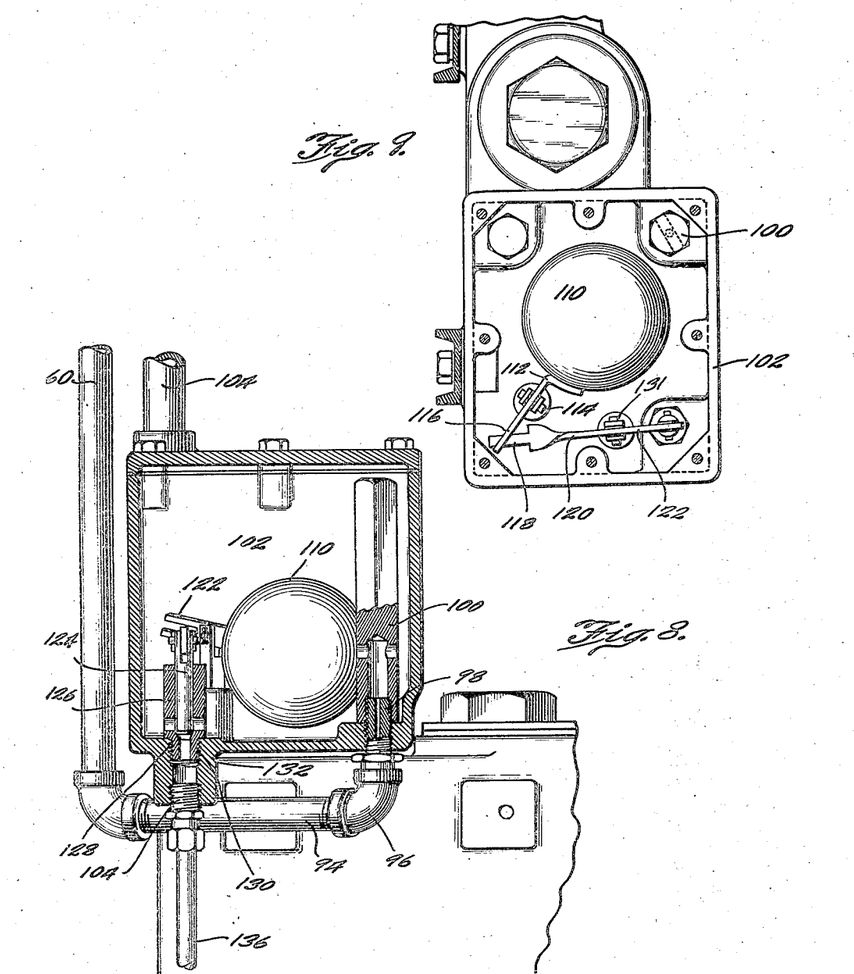
Fig. 8 is a section on the line 8—8 of Fig. 7.
Fig. 9 is a section on the line 9—9 of Fig. 7.

In lieu of having the air release pipe 60 (see Fig. 4) connect with pipe 62 and then into the underground tank 2, and thence by way of pipe 6 to the atmosphere, I may also provide an arrangement shown in Figs. 7, 8 and 9, whereby the released air may pass to the atmosphere within the dispensing unit. This type of construction is particularly useful where the invention is used to replace old types of pumps and where it is impractical to tear up the concrete for the purpose of adding return lines 62 and 60 to the tank. In the construction shown in Figs. 7, 8, and 9, I provide an arrangement wherein the air released is discharged to atmosphere within the dispensing unit and wherein any overflow of liquid is returned to the pump line, or any other desired practical part of the liquid flow line. In this construction pipe 60 connecting with the vent pipe 48 terminates in an elbow 94 having a coupling 96 threading into a nipple 98, which, in turn, threads into an opening into an enclosed float chamber 102 mounted on any suitable rigid portion within the housing 12. This float chamber is connected at its upper portion with a pipe 104 terminating at the top of the housing 12 where it is provided with a nipple 106 and a screen 108 so that any entrained gas or air lodging in the float chamber 102 will pass out through the pipe 104 with its screened opening 108. As is well known in the art, the discharge 108 is for the purpose of discharging air and gas to atmosphere, the discharge being located within the upper portion of the housing to comply with the fire underwriters' requirements. In addition, the float chamber is also provided with a float 110 which may be a hollow metal ball of the usual type, provided with a rigid connection to a lever 112, which lever is pivoted as at 114 to the bottom of the float chamber 102 and wherein the outer end 116 of such lever is adapted to overlie the outer end 118 of a lever 120 which is pivoted as at 121 on the bottom of the float chamber, and wherein the outer end 122 of said lever is pivotally connected to a vertically disposed valve 124 riding in a bearing 126 formed in a nipple threading at 128 into an outlet or sleeve 130 formed in the bottom of the float chamber 102. The valve 124 is arranged to close the opening to the nipple 130. A threaded fitting 134 is connected to the opening in this sleeve 132. The pipe 136 connects to the fitting; this pipe 136 in turn connects at 138 to the suction side of the pump. By means of the foregoing arrangement it will be understood that any liquid flowing through the vent pipe 48 down through pipe 60 will accumulate in the float chamber 102, and as the float 110 rises, valve 124 will be opened, allowing the suction side of the pump to draw liquid out of this chamber through pipe 136. This arrangement eliminates the necessity of returning the liquid line from pipe 60 back to the underground tank.

Figures 4, 6:
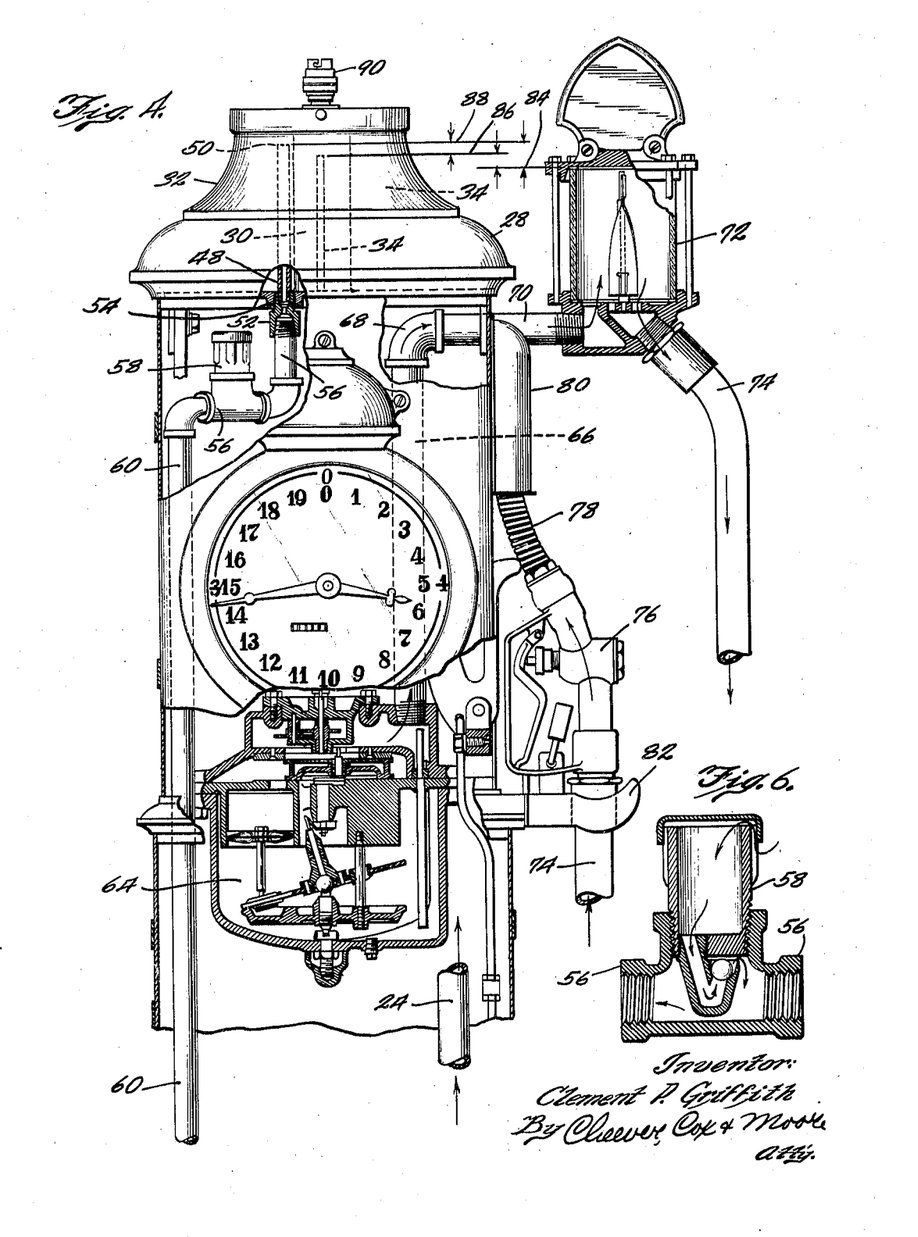
Fig. 4 is a view taken at right angles to Fig. 3.
Fig. 6 is a sectional view of the siphon breaker for the vent line.

The gasoline discharge pipe 46 from the reservoir 44 discharges into a meter 64 and the liquid passes through the metering device and thence out through pipe 66, see Fig. 4. Pipe 66 extends upwardly and turns at the elbow 68, thence passes laterally through the side of the housing as at 70 and connects to the sight glass 72. The details of construction of this sight glass 72 are not claimed herein since they form the subject matter of a separate application. From the sight glass 72 the liquid discharges through the flexible hose 74 which is provided with a manually operated control valve 76. The nozzle 78 of this hose is shown as being housed within the sleeve 80 attached to one side of the housing but it will be understood that when the hose is adapted to be used the nozzle is removed from the housing 80 and from the supporting hook 82.

By reference to Fig. 4 of the drawings it will be seen that the top of the visible sight glass 72, as indicated by the line 84, is below the top edge of the dam walls 34 and 36. The upper edge of these walls are indicated by the line 86. It will also be seen that the open top of the air relief pipe 50 is not only located above the top of the sight glass cylinder 72 but is also located above the upper edge of the dam walls 34 and 36. This is indicated by the line 88. By reason of the differences in elevation of the upper end of the air relief pipe 50 and the upper edges of the dam 34 and 36, when gasoline is pumped into the chamber 42 it will rise in said chamber until the chamber is filled and then will flow over the tops of the dams 34 and 36 into the chamber 44 and will flow therethrough and out through pipe 46 to the meter 64, through the meter and out through pipe 66 to fill the sight glass and then out through the sight glass through the wet hose 74 to the nozzle. At the termination of the liquid dispensing operation when the valve 76 of the nozzle is closed the hose 74, sight glass 72, and connections 70 and 66, the meter and the pipe 46, and reservoir compartment 44 will be held full of liquid, the level of liquid in the reservoir 44 being up to the tops of the dam walls 34 and 36. It will be noted that except for the valve 76 in the nozzle there are no other valves in the liquid line from this valve 76 back to the reservoir 44. It will also be noted that the dam walls 34 and 36 divide the reservoir into two separate reservoirs and that the liquid in the smaller reservoir 34 which connects with the discharge line 24 from the pump is separated from the liquid in the other reservoir compartment 44, so that if there be a leak in the suction line 24 from the pump or lower reservoir 2, and the upper reservoir 42, the liquid in this upper reservoir will leak back into the reservoir 2, but the liquid in the reservoir 44 will remain therein because of the dams, hence, irrespective of whatever happens to the suction line 24, the liquid line from the reservoir 44 to the nozzle 76 is maintained full of gasoline thereby insuring a correct measurement on the next dispensing operation. In most instances it is preferable to place some type of valve in the suction line for the purpose of keeping the pump primed so as to facilitate and expedite a dispensing operation, however, aside from the use of a valve in the suction line for this purpose, by my arrangement of liquid reservoir disposed in the highest point in the liquid flow line and constructed and arranged as hereinbefore described, I am enabled to keep the discharge line from the meter to the nozzle constantly full of liquid irrespective of whatever happens to the suction line and irrespective of any leakage of any valve therein, and also by the same token am enabled to eliminate the necessity of providing valves in the suction line as heretofore for keeping the liquid line from the meter to the nozzle full of liquid.

By placing the open end of the relief pipe 50 above the top of the dam walls 34 and 36 and likewise above the highest point in the liquid flow line from the pump discharge and prior to the liquid reaching the meter, and particularly in the manner illustrated, I am enabled to collect and remove any entrained gas or air from the liquid and discharge the same without passing it through the meter, thereby preserving and maintaining the correct measurement of the liquid flowing through the meter. In this respect it will be noted that the top of the pipe 50 is disposed above the top edge of the dam walls 32 and 34 whereby liquid discharged from the pump into the line 24 will pass into a reservoir 42 and thence over the dam walls into reservoir 44. Any gas or air entrained, will rise to the top of the casting 28 and will collect at the top thereof and will thence pass downwardly through pipe 50, thence through pipe 56 and thence through pipe 60 and be discharged through atmosphere by a pipe 62, filling pipe 4 and outlet pipe 6. Thus I provide means for discharging the entrained air which air discharged is disposed above the highest point of the liquid flow line and in a manner so as to not interrupt the flow of the liquid to the meter.

Under certain conditions of operation of my device I have found that the siphon condition is liable to develop in the air vent line 56 so as to interfere with the correct operation of the pump. For instance, if a siphon condition should develop in this air vent line 56 and the operator should open the hose nozzle when the pump is shut off, gasoline or liquid will siphon back from the air release to the underground tank and run the meter backwards. In order to overcome this I have provided a vent fitting 58 which is adapted to let air into this pipe 56 to break the siphon but will not let any air or liquid out. In other words, the vent line shown in Fig. 6 is simply a ball check valve to act as a siphon breaker for the vent line.

Attention is directed to the fact that the sleeve 30 formed in the casting 28 is hollow and is adapted to form a conduit for electrical connection connected to an electric light socket 90 mounted at the top of the casing 28, and adapted to be enclosed by a display globe 92 resting in the circular flange 94 of the upper part of the casting. by this means an electric lamp in the socket 90 will illuminate the globe 92.

Having thus fully described my invention, what I claim as new and desire to obtain by Letters Patent of the United States is:

1. In a liquid dispensing system, the combination of a liquid-containing storage tank, a pump a meter disposed above the tank, means forming a liquid reservoir located above the meter, a hose connected to the discharge of said meter and provided with a valve, said liquid reservoir having an upstanding partition terminating short of the top of said reservoir whereby to provide two liquid containing chambers communicating by means of the space above said partition, a liquid conduit connecting the pump with one of said chambers, and a liquid conduit connecting the meter with the other of said chambers.

2. In a liquid dispensing system, the combination of a liquid-containing storage tank, a pump, a meter disposed above the tank, means forming a liquid reservoir located above the meter, a hose connected to the discharge of said meter and provided with a valve, said liquid reservoir having an upstanding partition terminating short of the top of said reservoir whereby to provide two liquid containing chambers communicating by means of the space above said partition, a liquid conduit connecting the pump with one of said chambers and a liquid conduit connecting the meter with the other of said chambers, one of said chambers being provided with an air outlet for removing entrained air or gas from the liquid.

3. In a liquid dispensing system, the combination of a liquid-containing storage tank, a pump, a meter disposed above the tank, means forming a liquid reservoir located above the meter, a hose connected to the discharge of said meter and provided with a valve, said liquid reservoir having an upstanding partition terminating short of the top of said reservoir whereby to provide two liquid containing chambers communicating by means of the space above said partition, a liquid conduit connecting the pump with one of said chambers and a liquid conduit connecting the meter with the other of said chambers, one of said chambers being provided with an air outlet for removing entrained air or gas from the liquid, said air outlet communicating with the storage tank, and said storage tank having an air outlet.

4. In a liquid dispensing system, the combination of a liquid-containing storage tank, a pump, a meter disposed above the tank, means forming a liquid reservoir located above the meter, a hose connected to the discharge of said meter and provided with a valve, said liquid reservoir having an upstanding partition terminating short of the top of said reservoir whereby to provide two liquid containing chambers communicating by means of the space above said partition, a liquid conduit connecting the pump with one of said chambers and a liquid conduit connecting the meter with the other of said chambers, one of said chambers being provided with an air outlet for removing entrained air or gas from the liquid, said air outlet communicating with the storage tank, and said storage tank having an air outlet, said air outlet line being provided with a siphon breaking means.

5. A dispensing unit for connection with a gasoline tank comprising an upstanding housing, said housing including a pump connected to the tank, a meter carried by the housing, there being means providing a relatively large reservoir mounted substantially at the top of the housing, said reservoir having internal walls providing a dam separating the tank into two chambers in communication by means of the dam, a liquid conduit connecting the pump with the bottom of one of said chambers, and a conduit connecting the meter with the bottom of the other of said chambers, a sight glass mounted on the housing substantially at the top thereof, a connection from the meter to the sight glass, and a hose connected to the sight glass and provided with a valve controlled nozzle, the upper portion of said dam being above the top of the sight glass.

6. A dispensing unit for connection with a gasoline tank comprising an upstanding housing, said housing including a pump connected to the tank, a meter carried by the housing, there being means providing a relatively large reservoir mounted substantially at the top of the housing, said reservoir having internal walls providing a dam separating the tank into two chambers in communication by means of the dam, a liquid conduit connecting the pump with the bottom of one of said chambers, and a conduit connecting the meter with the bottom of the other of said chambers, a sight glass mounted on the housing substantially at the top thereof, a connection from the meter to the sight glass, and a hose connected to the sight glass and provided with a valve controlled nozzle, the upper portion of said dam being above the top of the sight glass, one of said chambers having an air vent located above the level of the dam for the purpose of removing the air or gas accumulating in said chamber.

7. A dispensing unit for connection with a gasoline tank comprising an upstanding housing, said housing including a pump connected to the tank, a meter carried by the housing, there being means providing a relatively large reservoir mounted substantially at the top of the housing, said reservoir having internal walls providing a dam separating the tank into two chambers in communication by means of the dam, a liquid conduit connecting the pump with the bottom of one of said chambers, and a conduit connecting the meter with the bottom of the other of said chambers, a sight glass mounted on the housing substantially at the top thereof, a connection from the meter to the sight glass, and a hose connected to the sight glass and provided with a valve controlled nozzle, the upper portion of said dam being above the top of the sight glass, one of said chambers having an air vent located above the level of the dam for the purpose of removing the air or gas accumulating in said chamber, said air vent communicating with the underground tank.

8. In a dispensing unit the combination with a housing carrying a meter at its upper portion, said meter providing a visible dial on the exterior of the housing, a pump carried by said housing, there being a connection from said pump adapted to be connected to a gasoline reservoir, the upper portion of said housing having a substantially bowl-shaped member disposed above the meter, said bowl-shaped member being provided with an internal tubular sleeve having integral upstanding webs joining with the sides of the bowl to provide two chambers, the upper portions of said web being constructed and arranged to provide a dam permitting liquid from one of said chambers when full to flow over the top of the dam into the other, and a pipe connecting said pump and discharging into one of said chambers and a pipe connected to the bottom of the other chamber and discharging into the meter, a sight glass supported by said housing and having a connection to the discharge end of the meter and to a hose terminating in a valve-controlled nozzle, the upper portion of said dam being disposed above the top of said sight glass.

9. In a dispensing unit the combination with a housing carrying a meter at its upper portion, said meter providing a visible dial on the exterior of the housing, a pump carried by said housing, there being a connection from said pump adapted to be connected to a gasoline reservoir, the upper portion of said housing having a substantially bowl-shaped member disposed above the meter, said bowl-shaped member being provided with an internal tubular sleeve having integral upstanding webs joining with the sides of the bowl to provide two chambers, the upper portions of said web being constructed and arranged to provide a dam permitting liquid from one of said chambers when full to flow over the top of the dam into the other, and a pipe connecting said pump and discharging into one of said chambers and a pipe connected to the bottom of the other chamber and discharging into the meter, a sight glass supported by said housing and having a connection to the discharge end of the meter and to a hose terminating in a valve-controlled nozzle, the upper portion of said dam being disposed above the top of said sight glass, said chamber connecting with the meter having a pipe extending through the bottom wall of said chamber with its open end terminating in said chamber above the upper edge of the dam and said pipe being adapted to communicate with the gasoline reservoir.

10. A liquid dispensing unit comprising an upstanding housing carrying a meter having a registering dial and carrying a pump and having a sight glass provided with a discharge hose and a nozzle, said housing having upper walls providing a bowl-shaped reservoir at its top, said reservoir being constructed to provide two chambers communicating with one another at their upper portions only, a connection between the pump and one of said reservoirs and between the meter and the bottom of the other reservoir, an illuminating globe detachably mounted on the top of said reservoir, said reservoir being provided with an internally arranged sleeve and an electrical connection passing through said sleeve and connected to a lamp within said globe for the purpose of illuminating the same.

11. In a liquid dispensing system, the combination of a liquid-containing storage tank, a dispensing housing, a pump connected to said tank, a meter disposed above the tank within the housing, means forming a reservoir within the housing disposed above the meter, a liquid conduit from the pump extending upwardly discharging into said reservoir, a conduit connecting the bottom portion of the reservoir with the meter, an air vent disposed above the highest point in the liquid flow line between the pump and said reservoir, a float chamber, a connection from the air vent adapted to discharge in the float chamber, an outlet for the float chamber, a float control valve for said outlet, a pipe connecting the top of said float control chamber and discharging to atmosphere, and a liquid return line from said float control valve to the suction line of the pump.

12. In a liquid dispensing system, the combination with a housing enclosing a flow line communicating with fluid forcing means to receive liquid therefrom and terminating in a valve controlled liquid dispensing nozzle, of a cover or cap for said housing disposed above said flow line, said cover forming a closed compartment, partition means in said compartment dividing the same into a plurality of chambers communicating the one with the other over the top of the partition means, said compartment being connected to the flow line to receive fluid from the forcing means in one compartment whence the fluid may flow over the partition means into another compartment, said other compartment being connected to the dispensing nozzle.

13. In a liquid dispensing apparatus, the combination with a pump stand, a hollow dome at the top of said stand, a pump enclosed by said pump stand having an intake conduit for connection with a liquid supply tank, and a discharge conduit for conducting liquid from said pump to said hollow dome, means forming a conduit connecting the upper portion of said hollow dome to the suction side of the pump, a float valve controlling the flow of liquid through said conduit whereby liquid is passed through said conduit back to the suction side of the pump by the action of the pump due to movement of said float valve, a liquid meter disposed in said stand below said dome, a liquid conduit extending from the bottom of said dome to said meter, and a liquid dispensing conduit from said meter.

14. In a liquid dispensing apparatus, the combination with a pump stand, means forming a reservoir substantially at the top thereof, a pump having an intake conduit for connection with a liquid supply tank, a discharge conduit for delivering liquid from the pump to said reservoir, means for conducting liquid from within the upper portion of said reservoir back to the suction side of the pump and for discharging air from the reservoir to atmosphere, a float valve controlling the passage of the liquid back to the suction side of the pump, a liquid meter disposed in said stand below said reservoir, a liquid conduit extending from the bottom of said reservoir to said meter, and a liquid dispensing conduit from said meter.

15. In a liquid dispensing apparatus, a pump stand, a meter supported by said stand having a discharge provided with a dispensing nozzle, means disposed on said pump stand above the meter forming a liquid receiving chamber, a pump having an intake conduit from a liquid supply tank, said pump having a connection adapted to discharge liquid into said chamber, means forming a connection from said chamber to said subadjacently disposed meter, and means disposed in said liquid receiving chamber comprising a restricted outlet having a connection for conducting liquid back to the suction side of said pump and for discharging air and other gas to atmosphere.

16. In a liquid dispensing apparatus, the combination of a pump stand, a liquid meter disposed thereon, said meter having a dispensing line terminating in a sight-glass, said sight-glass discharging through a valve-controlled nozzle, means forming a liquid receiving means on said pump stand above the meter, a pump for pumping liquid from a source of supply to said liquid-receiving means, a connection from said liquid-receiving means to the meter, and means forming a restricted port disposed in said liquid-receiving means at a point above the top of said sight-glass, means for discharging liquid passing through said port back to the suction side of the pump and for discharging air passing therethrough to atmosphere.

17. In a liquid dispensing apparatus, the combination with a pump, a liquid meter, liquid-receiving means disposed above said meter and having a connection to the pump and provided with a dam for causing the liquid received therein to flow thereover, means for discharging the liquid overflowing said dam to said meter, means forming a restricted port in said liquid-receiving means above the top of said dam for the passage of liquid and gas therethrough, and means connected to said port for passing the air to atmosphere and for passing the liquid back to the suction side of said pump.

18. In a liquid dispensing device, the combination with a pump stand having a meter mounted thereon having a discharge to a sight-glass disposed above said meter, said sight-glass discharging to a valve-controlled nozzle, liquid-receiving means disposed on said pump stand above said meter, means for pumping liquid from a source of supply to said liquid-receiving means, means for discharging liquid from said liquid-receiving means to said meter, means for maintaining a liquid level in said receiving means upon the termination of the dispensing operation, which liquid level is above the liquid level in the sight-glass, and means disposed above said maintained liquid level in said liquid-receiving means and having a connection for discharging air in said liquid-receiving means to atmosphere.

19. In a liquid dispensing apparatus, a pump stand, a meter supported by said stand having a discharge provided with a dispensing nozzle, chambered means disposed on said pump stand above the meter, a pump having an intake conduit from a liquid supply tank, said pump having a connection adapted to discharge liquid into said chambered means, means forming a connection from said chambered means to said sub-adjacently disposed meter, and restricted outlet means disposed in said chambered means and having connecting means for conducting liquid from said chambered means back to the suction side of the pump and for discharging air from said chambered means to atmosphere.

20. In a liquid dispensing apparatus, a pump stand, a meter supported by said stand having a discharge provided with a dispensing nozzle, chambered means disposed on said pump stand above the meter, a pump having an intake conduit from a liquid supply tank, said pump having a connection adapted to discharge liquid into said chambered means, means forming a connection from said chambered means to said sub-adjacently disposed meter, and restricted outlet means connected to said chambered means and having connecting means for conducting liquid from said chambered means back to the suction side of the pump and for discharging air from said chambered means to atmosphere.

CLEMENT P. GRIFFITH.